United States Patent [19]
Koyanagi et al.

[11] Patent Number: 5,389,968
[45] Date of Patent: Feb. 14, 1995

[54] CCD TELEVISION CAMERA WITH SEPARATED CAMERA HEAD

[75] Inventors: Yukio Koyanagi, Tokyo; Yuji Suwa, Yokohama, both of Japan

[73] Assignees: Yugengaisha Wai-Kei Kikaku, Tokyo; Komatsu Denshi Kabushiki Kaisha, Komatsu, both of Japan

[21] Appl. No.: 862,881

[22] Filed: Apr. 3, 1992

[30] Foreign Application Priority Data

Apr. 11, 1991 [JP] Japan .................. 3-166527

[51] Int. Cl.⁶ ............................................ H04N 5/232
[52] U.S. Cl. ........................................ 348/222; 348/6;
348/61; 348/506; 348/211
[58] Field of Search .................. 358/41, 19, 20, 86,
358/98, 93, 209, 210, 190, 229; 379/348;
354/484; 174/102 R; 307/3; 363/146; 340/310
R; H04N 5/232, 5/208, 5/225, 7/10, 7/14,
7/18; 348/222, 6, 61, 506, 211, 505, 65, 730, 373

[56] References Cited

U.S. PATENT DOCUMENTS 4,018,990  4/1977  Long ........................... 358/19
4,038,683  7/1977  Thorpe ......................... 358/19

FOREIGN PATENT DOCUMENTS 1213075  8/1989  Japan .
3157069  7/1991  Japan .
481091   3/1992  Japan .

*Primary Examiner*—James J. Groody
*Assistant Examiner*—Sherrie Hsia
*Attorney, Agent, or Firm*—Darby & Darby

[57] ABSTRACT

A CCD television camera has a head part separated from the rest of the camera. The camera head part contains a CCD imaging device and is connected by only a single line coaxial cable to a main part containing a DC power source, a line flag output circuit, and a one H-alternate switch. The coaxial cable may be up to several hundred meters in length. Respective ends of the coaxial cable are connected to the head and main parts through hybrid coils to facilitate sending of DC power current and an accurately controlled sinusoidal clock frequency signal from the main part to the camera head part, and the sending of video signals over the same single cable line from the camera head part to the main part. The hybrid coils are tuned for resonance with the clock frequency and a PLL circuit, including the coaxial cable, regulates the clock frequency to adjust for different lengths of cable.

8 Claims, 4 Drawing Sheets

CCD TELEVISION CAMERA WITH SEPARATED CAMERA HEAD

FIELD OF THE INVENTION AND RELATED ART STATEMENT

1. Field of the Invention

The present invention relates to a CCD TV camera, and particularly to improvements in the CCD TV camera having a separated camera head hereinafter called a separate type CCD TV camera.

2. Description of the Related Art

The conventional CCD TV camera of the separate type comprises: a small and portable camera head part including a CCD solid state imaging device, a clock driver circuit and an output-buffer circuit; and a fixed part including a DC power source, driving signal generator. The and the portable camera head part and the fixed part are connected by a multiple-wire cable, so that output of the CCD solid state imaging device is transferred to the fixed part.

The above-mentioned conventional separate type CCD TV camera has been configured by connecting a camera head part and a fixed part with each other by means of a multiple core cable in a manner that driving signals for operating a CCD imaging device in the camera head part are transmitted from the fixed part through the multiple-core cable and that an output signal of CCD imaging device, or a video output signal based thereon, is transmitted in the opposite direction, i.e., from the camera head part to the fixed part. In such configuration, the length of the multiple-core cable is limited only to several meters, because of poor transmission characteristics of the multiple-core cable for tile transmissions of the CCD-driving signal (i.e., clock signal for CCD driving) and for transmission of the output signal of CCD imaging device, and also because of the large weight and volume of the multiple-core cable.

OBJECT AND SUMMARY OF THE INVENTION

The present invention purposes to provide a novel and useful improvement in the CCD TV camera, wherein its camera head part and fixed parts can be connected by a known simple, long, thin and light-weight single-core coaxial cable.

Thereby, the CCD TV camera of the present invention can perform with satisfactory characteristics without losing high frequency characteristics of the video signal even when the connection cable between the head part and the fixed part extends to several hundred meters.

The separate type CCD TV camera in accordance with the present invention comprises:
a camera head part including a CCD imaging device, clock generator, signal processing circuits for processing output signal of the CCD imaging device to form a composite video signal, and a first coupling circuit having a first hybrid coil, whose secondary coil is connected to the clock generator,
a fixed part including a DC power source, a video signal synthesizer circuit, reference clock signal oscillation means and a second coupling circuit having a second hybrid coil, and
a single coaxial cable which connects the camera head part and the fixed part via the first coupling circuit and the second coupling circuit, respectively, in a manner that one end of the center conductor of the coaxial cable is connected through a primary coil of the first hybrid coil to DC voltage regulators of the camera head and the other end of the same is connected through a primary coil of tile second hybrid to the DC power source and to the video signal synthesizer circuit, a secondary coil of the second hybrid coil being connected to the reference clock signal oscillation means.

As a result of the above-mentioned configuration, the fixed part (F) of the separate-type CCD TV camera receives external synchronization signal (53) from outside, and, after controlling quasi horizontal synchronization signal (38) by utilizing the external synchronization signal (53), form a reference clock signal (13) and send it to the camera head part (CH), through the coaxial cable (1), which is connected through tuned hybrid coils (2, 4) at respective ends thereof. Then in the camera head part (CH), the transmitted reference clock signal is utilized for operating the clock generator (22) so as to compose a composite video signal together with the information given by the CCD imaging device (21).

Thus, the fixed part (F) sends the reference clock signal and a DC current from its DC power source (14), through the single coaxial cable (1), to the camera head part (CH). And in the camera head part (CH), a clock generator (22) issues CCD driving clock signal (23) for operating the CCD imaging device (21), and further issues several signals which are necessary for producing a known composite video signal.

The output signal of the CCD imaging device (21) is sample-held and amplified by a clamp amplifier (26), and combined with a known composite synchronization signal. In the camera head part (CH), a known color burst (35) is superposed onto the synchronization signal during the period of every two horizontal lines, thereby to form the known composite video signal. Therefore, in the fixed part (F), by detecting the existence of the color burst, the odd or even number of the horizontal line can be detected, and color decoding is made.

The central conductor (101) of the coaxial cable (1) is terminated by a 75 Ω resistor in the camera head part (CH), and further is grounded for high frequency signals by a capacitor, so that DC current fed through the central conductor (101) is fed to various parts of the circuit of the camera head part (CH), through voltage regulation circuits (155, 177).

The composite video signal, which is transmitted from the camera head part (CH) through the coaxial cable (1) to the fixed part (F), is sent to the negative polarity, and therefore the average DC current is smaller than the case of positive polarity transmission. Therefore, the power consumption in the output transistor (7) is considerably decreased In the camera head part (CH).

As a result of the combination of the above-mentioned cooperative works In the camera head part (CH) and in the fixed part (F), such a long extension of the coaxial cable (1) as several hundred meters can be realized without deteriorating characteristics and functions of the video camera as a whole. And furthermore the camera head part (CH) can be configured very compact, since complicated circuits such as a phase-discriminator (52) and a voltage controlled oscillator (VCO)(11) for producing the reference clock signal (13) are located in the fixed part (F) Instead of the camera head part (CH), and since substantially no circuit adjustment devices are provided in the camera head part (CH).

Furthermore, a PPL Is constituted which comprises a synchronization separation circuit (37), the phase discriminator (52) receiving the external synchronization signal (53), the VCO (11), the coaxial cable (1), the clock generator (22), the output line of the composite synchronization signal (32), the adder (35) and the coaxial cable (1). This PLL controls the phase of the horizontal synchronization signal (38) to that of the external synchronization signal (53) irrespective of length coaxial cable (1).

While the novel features of the invention are set forth particularly in the appended claims, the invention, both as to organization and content, will be better understood and appreciated, along with other objects and features thereof, from the following detailed description taken in conjunction with the drawings.

BRIEF DESCRIPTION OF THE INVENTION

DESCRIPTION OF THE PREFERRED EMBODIMENT

Hereafter, a preferred embodiment is described with reference to the accompanying drawings.

Figure 1:
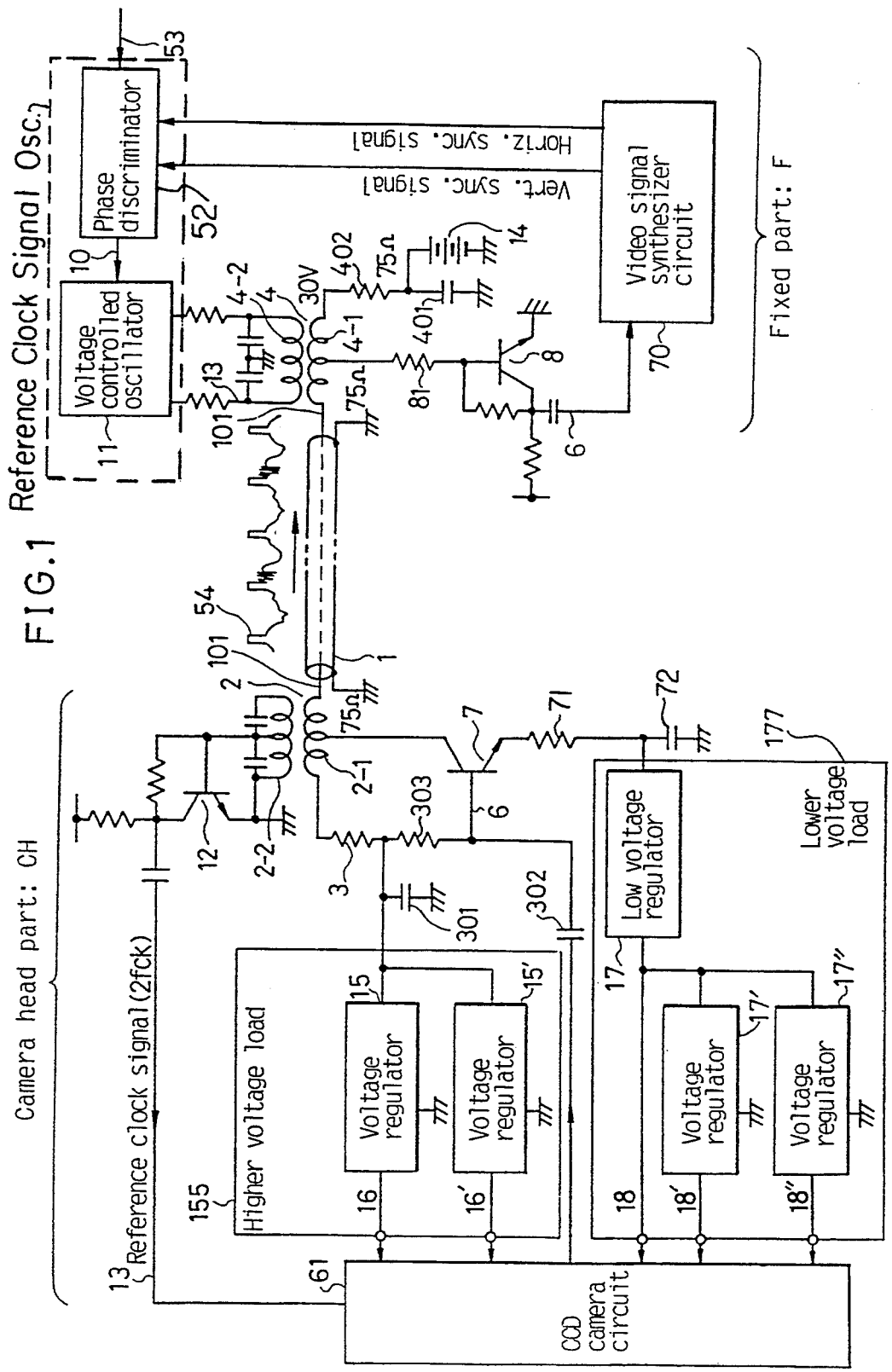
FIG. 1 is a circuit diagram of the whole system of the principle example of the separate type CCD TV camera embodying the present invention.
Figure 2:
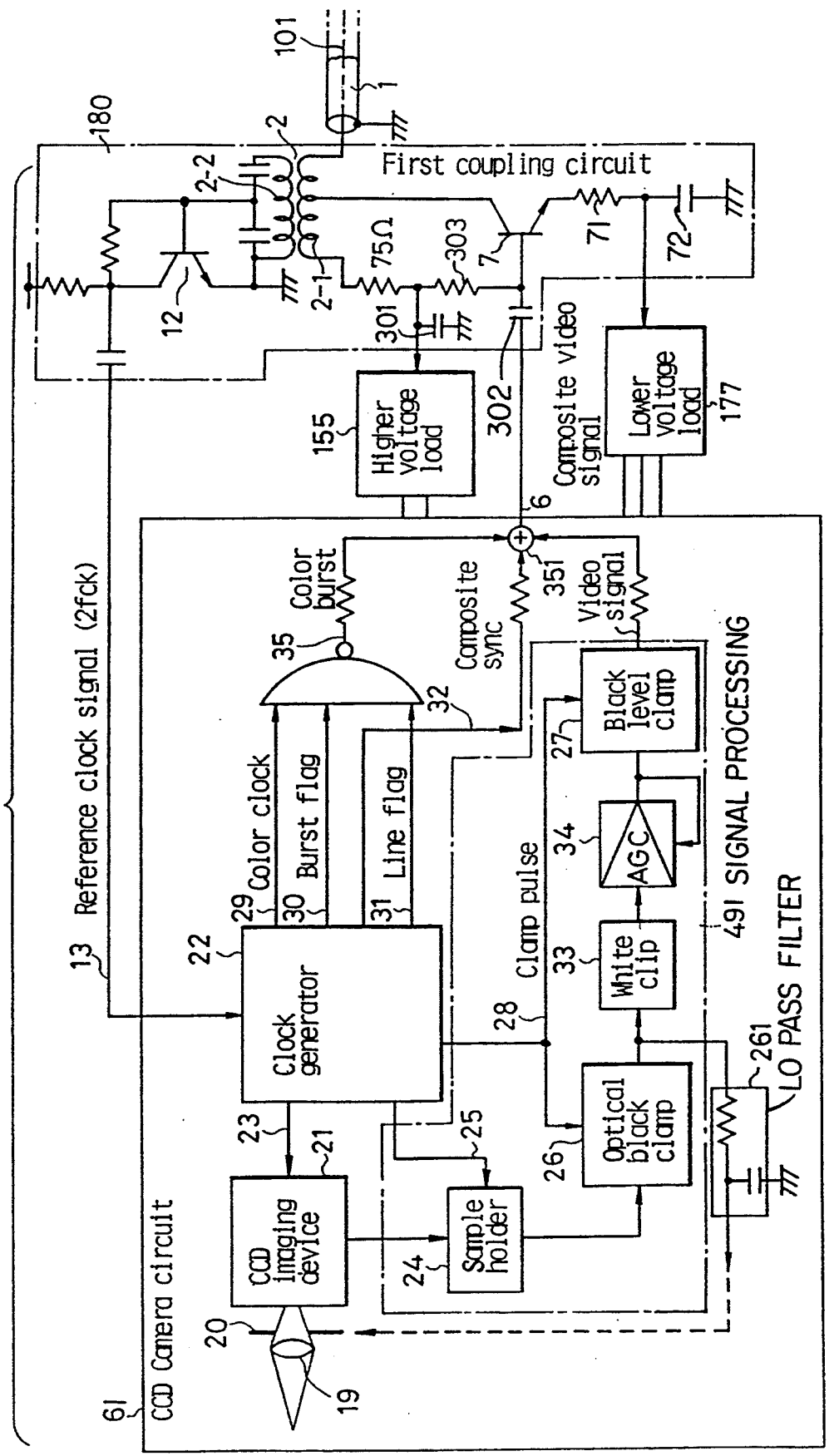
FIG. 2 is a circuit diagram of a camera head part of the system of FIG. 1.
Figure 3:
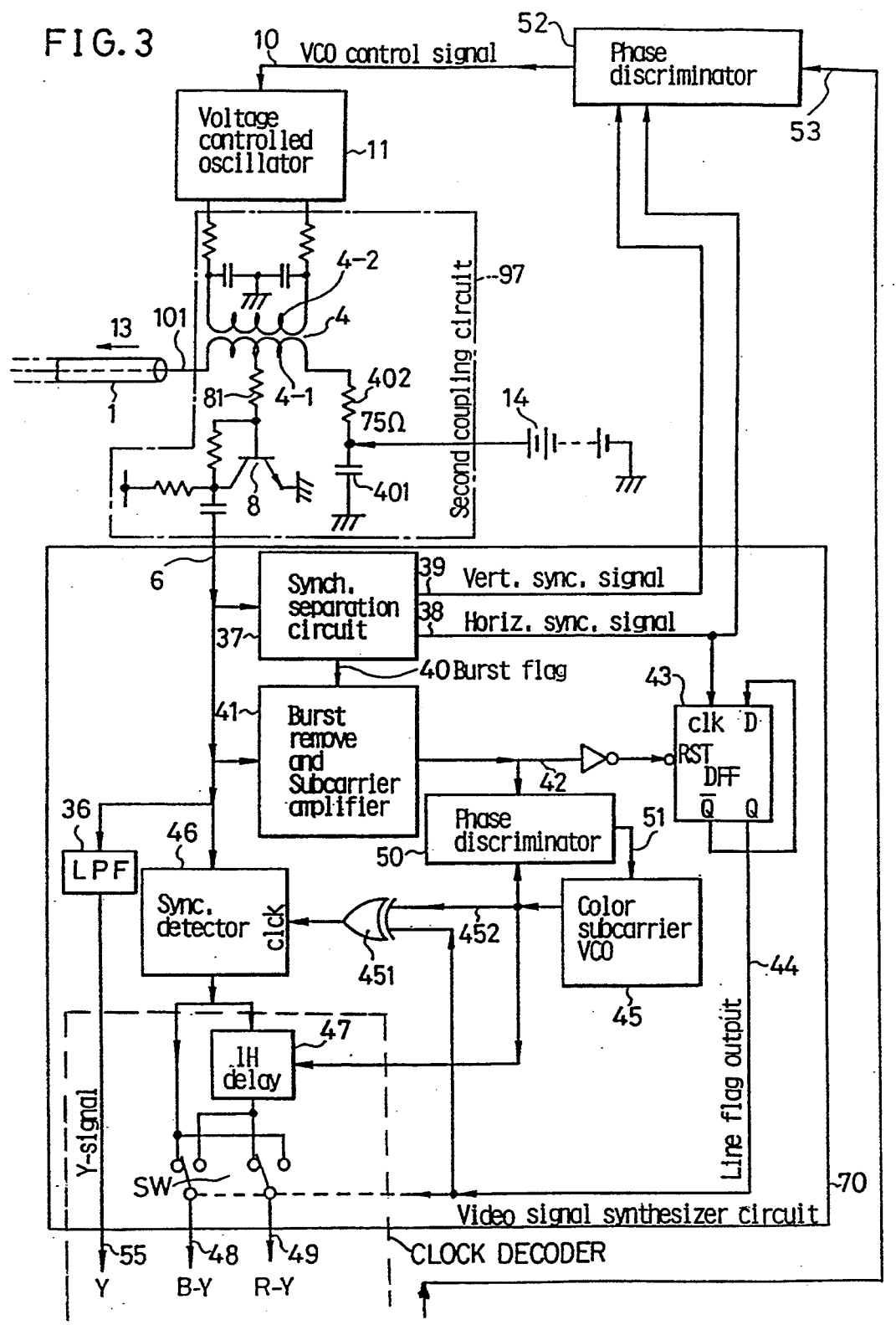
FIG. 3 is a circuit diagram of a fixed part of the system of FIG. 1.

FIG. 1 to FIG. 3 shows an embodiment of principle, wherein FIG. 1 shows the circuit configuration of the whole system, FIG. 2 shows that of the camera head part CH and FIG. 3 shows that of the fixed part F.

The camera head part CH and the fixed part F are connected with each other by a long and simple known single coaxial cable 1. The length can be several hundred meters, thanks to the technical advantage of the present invention.

In the camera head part CH, one end of the coaxial cable 1 is connected to one end of the primary coil 2-1 of a first hybrid coil 2 (transmitting-end hybrid coil); and the other end of the primary coil 2-1 is grounded by a first high-frequency grounding capacitor 301, through a 75 Ω resistor 3. And the Junction point between the resistor 3 and the capacitor 301 is connected further to a higher voltage distributor 155.

The output end of a CCD camera circuit 61 is connected through a capacitor 302 to the base of a transmitting transistor 7, whose collector is connected to the center tap of the primary coil 2-1 for transmitting the amplified composite video signal from the CCD camera circuit 61. A resistor 303 is connected across the base of the transistor 7 and the first high frequency grounding capacitor 301. The emitter of the transistor 7 is grounded through a resistor 71 by a second high-frequency grounding capacitor 72, and the Junction point between the resistor 71 and the second high-frequency grounding capacitor 72 is connected to the lower voltage distributor 177.

In the fixed part F, one end of the coaxial cable 1 is connected to one end of the primary coil 4-1 of a second hybrid coil 4 (receiving-end hybrid coil); and the other end of the primary coil 4-1 is grounded by a third high-frequency grounding capacitor 401, through a 75 Ω resistor 402. And the Junction point between the resistor 402 and the capacitor 401 is further connected to a DC power source 14. The center tap of the primary coil 4-1 is connected through a resistor 81 to the base of a buffer transistor 8, which issues composite video signal 6 from its collector to a video signal synthesizer 70.

On the other hand, the reference clock signal 13 is supplied from the fixed part F to the camera head part CH as follows: An external synchronization signal 53 is given to a phase discriminator 52, which receives quasi vertical synchronization signal 39 and quasi horizontal synchronization signal 38 from a video signal synthesizer circuit 70 in the fixed part F. (Hereafter the words quasi are omitted for brevity.) Then, the phase discriminator 52 issues VCO control signal 10 to a voltage controlled oscillator (VCO) 11, which applies the reference signal 13 to the secondary coil 4-2.

The phase discriminator 52 controls the voltage controlled oscillator 11 In a manner that, when the phase of the horizontal synchronization signal 38 lags behind or leads the phase of the external synchronization signal 53, the frequency of the output of the voltage controlled oscillator 11 is increased or decreased, respectively.

The reference signal 13 is transmitted, through the primary coil 4-1 of the second hybrid coil 4 in the fixed part (F), the coaxial cable 1, the primary coil 2-1 and the secondary coil 2-2 of the first hybrid coil 2, to the base of the transistor 12 in the camera head part CH. And after being amplified by the transistor 12, the reference signal 13 is given to the CCD camera circuit 61.

The secondary coils 2-2 and 4-2 of the hybrid coils are tuned by connecting resonating capacitors to each of them as shown in FIG. 1 through FIG. 3, In a manner to resonate with the reference clock frequency 13 which is transmitted through the coaxial cable 1. Therefore, even when the coaxial cable 1 is several hundred meters long, sufficient transmissions of the video signal and the reference clock signal are achievable, thereby assuring satisfactory picture quality. The length is limited mainly by the voltage of a DC power source (14) and current consumption in the camera head part CH.

DC power voltages are fed to various parts of the camera head part CH as follows: DC current from the DC power source 14 in the fixed part F is fed, through a resistor 402, the primary coil 4-1, the center conductor 101 of the coaxial cable 1 and the primary coil 2-1, the plural voltage regulators 15 and 15' of the higher voltage distributor 155, and further through a transistor 7 to the plural voltage regulators 17, 17' and 17" of lower voltage distributor 177. The output terminals 16, 16' of the voltage regulators 15, 15', and also the output terminals 18, 18', 18" of the voltage regulators 17, 17', 17" issues DC currents of various regulated voltages which are necessary for the CCD camera circuit 61.

By selecting the negative signal polarity of the composite video signal, as shown by 54, to be transmitted from the CCD camera circuit 61, through the transistor 7, the first coil 2, the coaxial cable 1, the second hybrid coil 4 and the transistor 8 to the video signal synthesizer circuit 70, it is possible to decrease the energy losses in the long coaxial cable 1 and to use a transistor 7 smaller than in the case of using a positive polarity composite video signal.

FIG. 2 shows the detailed circuit configuration of the camera head part CH. By using an optical lens 19 and a remote-control optical stop 20, an optical image is produced on the CCD imaging device 21. In the CCD camera circuit 61, the clock generator 22 receives the aforementioned reference clock signal 13, and thereby issues signals of CCD driving clock 23 to the CCD imaging device 21, sample clock 25 to a sample holder 24, clamp pulses 28 for an optical black clamp circuit 26 and a black level clamp circuit 27, and further for composing the composite video signal 6, issues the color clock 29, the burst flag 30, the line flag 31 and the composite synchronization signal 32. The circuits 24, 26, 33, 34 and 27 together form a signal processing circuit 491 (FIG. 2).

The composite synchronization signal 32 is formed to include the color burst in every other horizontal scanning period (i.e., In alternate 1 H period). Therefore, in the fixed part F, with respect to the composite video signal transmitted through the coaxial cable 1 and the hybrid coil 4, by detecting the existence and non-existence of the color burst in every other horizontal scanning periods, the odd or even number of the horizontal scanning line is detected by the burst remove and subcarrier amplifier 41 and the DFF 43 for color decoding.

Output signal from the CCD Imaging device 21 is sample-held by the sample holder 24, and then clamped by the optical black clamp 26. Output of the optical clamp 26 is, after passing a low pass filter 261, fed to the optical stop 20 so as to control the optical stop, and also given to a white clip 33. The output of the white clip 33 passes through an AGC circuit 34 and then the black clamp 27, and is given as the video signal to an adding point 351. At the adding point 351, the color burst 35 consisting of the color clock 29, the burst flag 30 and the line flag 31, the composite synchronization signal 32 and the video signal from the black level clamp 27 are added to each other, thereby constituting the composite video signal 6.

FIG. 3 shows the detailed circuit configuration of the fixed part F, which issues Y-signal, B-Y signal and R-Y signal as its output signal.

The received composite video signal 6, which has been transmitted through the coaxial cable 1 and the primary coil 4-1 of the second hybrid coil 4, is amplified by the transistor 8. The amplified composite video signal 6 is passed through a tow pass filter 36 thereby to issue the Y signal 55, and further led to a synchronization separation circuit 37, which produces vertical synchronization signal 39, horizontal synchronization signal 38 and burst flag 40.

A burst remove and subcarrier amplifier 41 receives the amplified composite video signal 6 and the burst flag 40 and issues a burst-removed subcarrier signal 42 to a clear input terminal of a D-flipflop 43 through an inverter circuit, and issues an output signal 44 which is a line flag signal.

A phase discriminator 50 compares phases of the output signal 42 of the burst remove and subcarrier amplifier 41 and the output signal of the color subcarrier VCO 45, and the output 51 of the phase discriminator 50 controls the color subcarrier VCO 45. And the color subcarrier VCO 45 sends output 452 to a synchronous detector 46 through an inverter 451 which inverts the polarity of the output 452 with the line flag signal 44. The polarity-inverted output 452 of the color subcarrier which is provided to the synchronous detector 46, serves as its clock signal. The output signal from the synchronous detector 46 and that passed through the 1 H delay circuit 47 are sent to and changed over by an electronic switch SW, which changes over is controlled by the line flag 44, thereby producing B-Y output 48 and the R-Y output 49.

Phases of the vertical synchronization signal 39 and the horizontal synchronization signal 38 are compared with the external synchronization signal 53 by the phase discriminator 52, which issues the VCO control signal 10 to the voltage controlled oscillator 11. Therefore, the voltage control oscillator 11 generates the reference clock signal 13 to be given to the CCD camera circuit 61 through the coaxial cable 1.

The afore-mentioned configuration has features that: a simple coaxial cable 1 connects the fixed part F and the camera head part CH intermediating the first hybrid coil 2 and the second hybrid coil 4 at respective ends; thereby the reference clock signal 13 is transmitted from the voltage controlled oscillator 11 through the coaxial cable 1 and the transistor 12 to the CCD camera circuit 61; and a DC power current from the DC power source 14 in the fixed part F is sent through the coaxial line 1 and the higher voltage distributor 155 and the lower voltage distributor 177; and in inverse direction, the composite video signal 6 is transmitted from the CCD camera circuit 61 through the transistor 7, the coaxial line 1 and the transistor 8 to the video signal synthesizer circuit 70. Thus the fixed part F and the camera head part CH are connected by only one coaxial cable which is far thinner and light-weight in comparison with the conventional multiple combination coaxial cable.

The primary coils 2-1 and 4-1 of the hybrid coils 2 and 4, which are connected to respective ends of the center conductor 101 of the coaxial cable 1, are only about two turns, and their reactances even for the highest frequency component (about 6 MHz) of the composite video signal is only about 0.2 $\mu$H, and is negligibly small. Since the reactance of the coaxial cable is about 75 $\Omega$, the insertion loss of the video signal by insertion of the primary coils 2-1 and 4-1 of the hybrid coils 2 and 4, respectively, is only less than about 0.12%, which is negligibly small.

On the other hand, since the secondary coils 2-2 and 4-2 of the hybrid coils are tuned so as to resonate with the reference clock signal 13 by connecting the capacitors thereto, the reference clock signal 13 can transmit on the coaxial cable 1 even though the length thereof is several hundred meters. Our experiment proved that even when the coaxial cable 1 is 300 meters long, the transmissions of the video signal and the reference signal are satisfactory, and the video signal is transmitted with satisfactory picture quality.

Since the camera head part CH has neither a complex oscillator circuits (e.g. having quartz-controlled and multiplied oscillation circuit for the reference clock signal), nor adjustment devices such as those provided In the voltage-controlled oscillation circuit, the camera head part CH is very compact, simple, light-weight and power saving.

The camera head part CH (FIG.2) and the fixed part F (FIG. 3) connected through the single coaxial cable 1 together constitute a PLL (phase-locked loop) system with regard to the quasi-horizontal synchronization signal 38 which operates as follows: The reference clock signal 13 issued by the VCO 11 in the fixed part F is transmitted through the coaxial cable 1 to the clock generator 22, thereby driving the clock generator 22 to issue necessary operating signals 23, 28, 29, 30, 31 and 32 therefrom. The composite synchronization signal 32 issued from the clock generator 22 Includes a quasi horizontal synchronization signal and a quasi vertical synchronization signal, and these are transmitted through the first coupling circuit 180 in the camera head part CH, the coaxial cable 1 and the second coupling circuit 97 in the fixed part F, to the synchronization separation circuit 37. The quasi horizontal synchronization signal 38 (hereinafter referred to simply as horizontal synchronization signal) is separated by the synchronization separation circuit 37 and led to the phase discriminator 52, wherein its phase is compared with the external synchronization signal 53. When the phase of the horizontal synchronization signal 38 lags behind that of the external synchronization signal 53, the phase discriminator 52 issues an output which increases the frequency of output of the voltage controlled oscillator 11; and when the phase of the horizontal synchronization signal 38 leads that of external synchronization signal, the phase discriminator 52 issues an output which lower the frequency of output of the voltage controlled oscillator 11. Therefore, the phase of the horizontal synchronization signal 38 is controlled always in a manner to agree with that of the external synchronization signal 53. That is, a PLL is formed which comprises and is configured to send the horizontal signal of the order of to the synchronization separation circuit 37, the phase discriminator 52 receiving the external synchronization signal 53, the voltage controlled oscillator 11, the second coupling circuit 97, the coaxial cable 1, the first coupling circuit 180, the clock generator 22, the output line of the composite synchronization signal 32, the adder 351, the first coupling circuit 180, the coaxial cable 1 and the second coupling circuit 97. This PLL is characterized by including the coaxial cable 1 therein, and the phase control operation of PLL is so made that the phase of the horizontal synchronization signal 38 agrees with that of the external synchronization signal 53, what so ever the phase delay of the PLL including the coaxial cable 1 is. Therefore, even when the coaxial cable 1 is exchanged from a long one (e.g. 300 m) to a short one (e.g. 10 m) or vice versa, there J s no need of manual adjustment of the circuit constant for such exchange.

Figure 4:
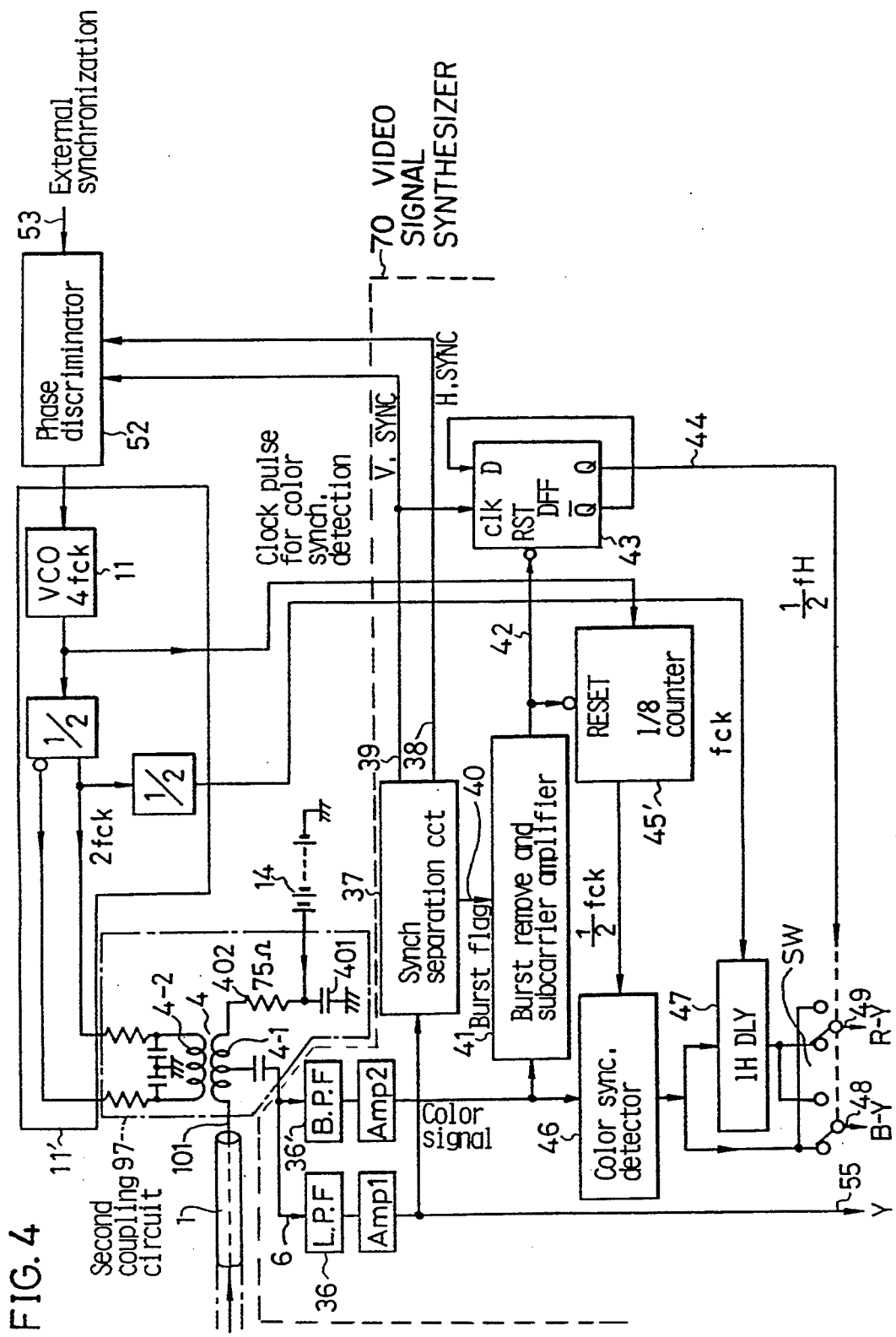
FIG. 4 is a circuit diagram of a diagram of a preferred concrete embodiment of the fixed part embodying the present invention.

FIG. 4 shows a circuit configuration of a modified and the best mode embodiment of the fixed part F. In this embodiment, a band-pass filter 36' is provided for producing the color signals to be sent to the color synchronous detector 46 in addition to and separately from the low-pass filter 36 of FIG. 3. Further, an inverter 451 of FIG. 3 is omitted, and an output signal ½·fck (fck: CCD's $H_1$ and $H_2$ driver clock frequency) from a ½-counter 45', which replaces the color subcarrier VCO 45 of FIG. 3, is directly fed to the clock input terminal of the color synchronous detector 46. The operation of this fixed part is similar to that of FIG. 3.

Although the present invention has been described in terms of the presently preferred embodiments, it is to be understood that such disclosure is not to be interpreted as limiting. Various alterations and modifications will no doubt become apparent to those skilled in the art after having read the above disclosure. Accordingly, it is intended that the appended claims be interpreted as covering all alterations and modifications as fall within the true spirit and scope of the invention.

What is claimed is:

1. A CCD TV camera with a separate camera head, comprising:
    a camera head part including a clock generator means for issuing control signals based on a reference clock signal, a CCD camera circuit with a CCD imaging device driven by a control signal of said clock generator means, signal processing circuits for processing an output signal of said CCD imaging device to form a composite video signal, and a first coupling circuit having a first hybrid coil, whose secondary coil is connected to said clock generator means to provide the reference clock signal thereto,
    a further part physically separable from said camera head part and including a DC power source, a video signal synthesizer circuit, reference clock signal oscillation means for producing the reference clock signal and a second coupling circuit having a second hybrid coil, and
    a single coaxial cable electrically connecting said camera head part and said further part via said first coupling circuit and said second coupling circuit, respectively, one end of a center conductor of said coaxial cable being connected to a primary coil of said first hybrid coil of the camera head part and the other end of said center conductor being connected to a primary coil of said second hybrid coil of said further part, said DC power source and said video signal synthesizer circuit being connected to the primary coil of said second hybrid coil so as to supply power to said camera head part and to receive the composite video signal from said camera head part, a secondary coil of said second hybrid coil being connected to said reference clock signal oscillation means so as to provide said reference clock signal to said clock generator means of said camera head part.

2. A CCD TV camera in accordance with claim 1, further including:
    a first terminating impedance with one end connected to said coaxial cable in said camera head part,
    a capacitor with its one end connected to the other end of said first impedance and its other end connected to ground so as to, ground the other end of the impedance with respect to high frequency signals in said camera head part, voltage regulators in said camera head part for receiving DC voltage from said DC power source and for supplying regulated DC voltages in said camera head part, and
    a second terminating impedance located in said further part with its one end connected to the other end of said coaxial cable at said further part, its other end connected to said DC power source.

3. A CCD TV camera in accordance with claim 2 wherein,
    said voltage regulator, includes a low Voltage regulator and higher voltage regulator, said higher voltage regulator being connected to the junction between said first impedance and capacitor, and
    a video signal issued from said CCD imaging device and processed by said signal processing circuits into said composite video signal is transmitted through said coaxial cable as a negative polarity signal, and,
    further including a transistor amplifier in said camera head part for amplifying said composite video signal, a collector of said transistor is connected through the primary coil of said first hybrid coil to said second terminating impedance, and an emitter thereof is connected to said low voltage regulator.

4. A CCD TV camera in accordance with claim 1, further including:
   combining means in said camera head part, for adding color bursts from said clock generator means in every other horizontal scanning period to form said composite video signal, and
   detecting means in said further part for detecting the presence of said color bursts in every other horizontal scanning period for forming a line flag output, and for discriminating odd or even order of horizontal scanning for color demodulation.

5. A CCD TV camera comprising:
   a reference clock signal circuit for producing a reference clock signal provided in a main part,
   a single coaxial cable coupled by one end thereof to an output end of said reference clock signal circuit for transmitting said reference clock signal to a camera head part whereto the other end of said coaxial cable is coupled,
   a clock generator included in a CCD camera circuit provided in said camera head part which receives said reference clock signal transmitted from said main part through said coaxial cable and issues a CCD-driving clock signal to a CCD imaging device in said CCD camera circuit, and further issues a color clock signal, burst flag signals, and line flag, which are combined to produce, a color burst signal and additionally issues composite synchronization signals and clamp pulse, which are for composing a composite video signal together with the output of said CCD imaging device, and
   a video signal synthesizer circuit, which is provided in said main part, said synthesizer circuit receives said composite video signal from said camera head part and produces a luminance signal and color difference signals, and forms a color subcarrier whose phase agrees with said color burst signal from said clock generator.

6. A CCD TV camera comprising:
   a reference clock signal circuit for producing a reference clock signal provided in a main part,
   a coaxial cable coupled by one end thereof to an output end of said reference clock signal circuit, said cable transmitting said reference clock signal in a first direction to a camera head part whereto the other end of said coaxial cable is coupled,
   a clock generator provided in said camera head part which receives said reference clock signal transmitted in said first direction from said main part through said coaxial cable and issues composite synchronization signals including a quasi horizontal synchronization signal, said composite synchronization signals being sent over the cable in a second direction to said main part, said first and second directions being opposites, and
   a video signal synthesizer circuit provided in said main part and including a synchronization separation circuit, which separates out said quasi horizontal synchronization signal and provides it to said reference clock signal circuit to comprise a phase-locked loop system including said coaxial cable therein.

7. A CCD TV camera in accordance with claim 1 wherein,
   said clock generator means is connected to receive said reference clock signal transmitted from said further part and to give a CCD driving clock to said CCD imaging device, a sample clock to a sample holder, clamp pulses to an optical black clamp circuit and to a black level clamp circuit, and further to give a color clock signal, burst flag signal, line flag signal and a composite synchronization signal including a horizontal synchronization signal to said further part,
   said reference clock signal oscillation means receives an external synchronizing signal and the horizontal synchronization signal from said camera head part and transmitted from said camera head part to said further part through said single coaxial cable; and
   further including comparison means for comparing said external synchronizing signal and said horizontal synchronization signal to produce a control signal, a VCO in said reference clock signal oscillation means, which is controlled by said control signal, provides the reference clock signal which is transferred from said further part to said camera head part through said single coaxial cable.

8. A CCD TV camera in accordance with claim 5 wherein,
   said composite synchronization signals include a horizontal synchronization signal, which is produced in said CCD camera circuit and transmitted from said camera head part to said main part through said single coaxial cable,
   said reference clock signal circuit includes oscillation means receiving an external synchronizing signal, and comprising means for comparing said horizontal synchronization signal with said external synchronizing signal to generate a control signal, and a VCO controlled by said control signal so as to generate said reference clock signal, which is transferred from said main part to said camera head part through said single coaxial cable.

* * * * *